(No Model.)
C. SELDEN.
MEANS FOR INCREASING LOCOMOTIVE TRACTION.
No. 537,078. Patented Apr. 9, 1895.
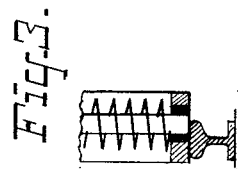
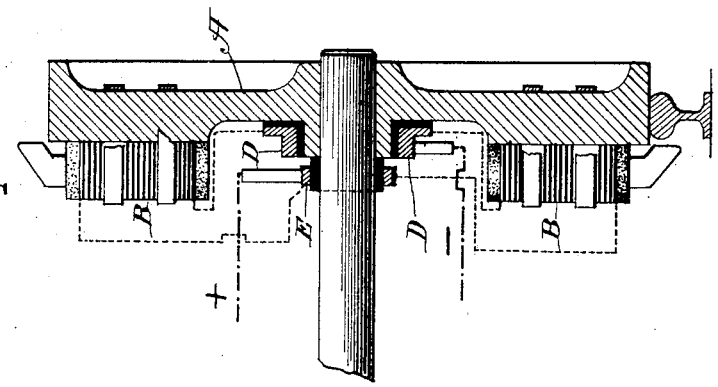
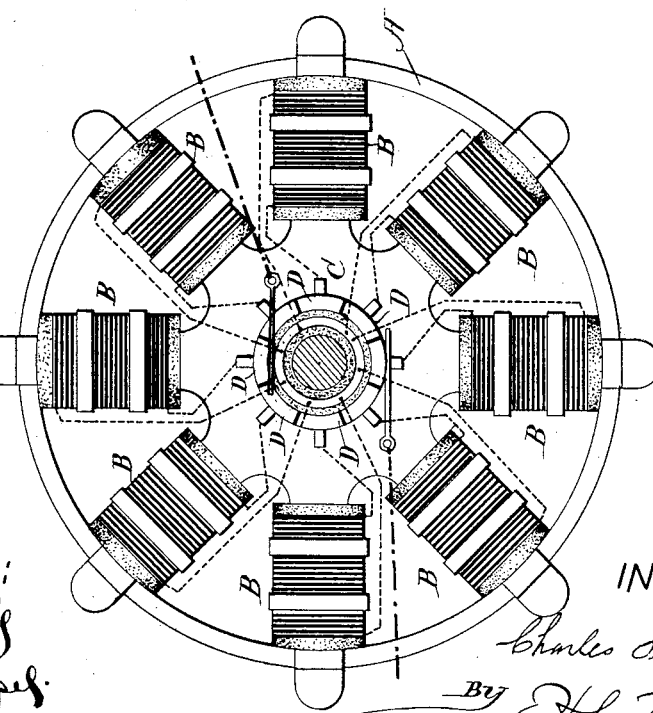

UNITED STATES PATENT OFFICE.

CHARLES SELDEN, OF BALTIMORE, MARYLAND.

MEANS FOR INCREASING LOCOMOTIVE TRACTION.

SPECIFICATION forming part of Letters Patent No. 537,078, dated April 9, 1895.

Application filed October 4, 1890. Serial No. 367,089. (No model.)

*To all whom it may concern:*

Be it known that I, CHARLES SELDEN, a citizen of the United States, and a resident of Baltimore, in the State of Maryland, have invented certain new and useful Improved Means for Increasing Locomotive Traction, of which the following is a specification.

My invention relates to an improved means for increasing locomotive traction or adhesion of the driving wheels of locomotives upon the rail.

Various plans for increasing the traction by the agency of magnetism have hitherto been proposed some of them involving the use of coils applied so as to render the whole wheel the pole of a magnet. It has also been proposed to wind the spokes of the locomotive drive wheel with coils. In both such instances the whole rim of the wheel becomes the pole of the magnet and the magnetism is dissipated or spread through the whole periphery and is not necessarily localized at the point where the wheel bears upon the rail.

The object of my present invention is to produce a more effective traction device by enabling the magnetic influence to be localized at the point where it will be effective.

A further object of my invention is to economize in the use of the electric energy employed in developing the magnetism that produces the attractive influence.

My invention consists in the combination with the locomotive drive wheel, of a series of independent electro-magnets having separate poles which are arranged in the circumference of a circle and properly supported or mounted so as to move in succession either into contact with or in immediate proximity to the rail, the poles of such magnets being magnetically separated or insulated from one another.

My invention consists further in the combination with the series of electro-magnets, of suitable commutating or circuit changing appliances for throwing each magnet into circuit as it comes into position with its pole end opposite the rail and throwing it out of circuit during the remainder of its revolution.

In carrying out my invention I preferably secure to the ordinary locomotive drive wheel a series of electro-magnets with their poles arranged in the circumference of a circle and magnetically separated from one another, though it would be within the scope of my invention to wind the magnetizing coils upon the spokes of the locomotive drive wheel provided, however, that the pole ends of such spokes or the ends which travel in contact with the rails were magnetically insulated from the rim of the driving wheel. The pole ends of the magnets may, as before stated, travel either in contact with the rail or in immediate proximity thereto. I prefer to use separate magnets fastened to the drive wheel or to the spokes thereof as hereinafter described.

In the accompanying drawings:—Figure 1, represents in side elevation a locomotive drive wheel constructed in accordance with my invention, the commutating or circuit changing devices fastened preferably upon the axle or hub being shown in section. Fig. 2, represents the wheel in vertical section with the magnets bound upon it. Fig. 3, is a section through a part of a wheel modified in construction.

A, is a locomotive drive wheel made of iron as usual, and B, B, &c., are the traction magnets which, as shown in the edge view Fig. 2, are supported or fastened preferably to the inner side of the wheel and by some means which will preserve the magnetic insulation of each magnet from the body of the drive wheel. The electro-magnets are preferably straight bar electro-magnets but have laminated cores to assist in the changes of magnetism which must take place therein when the wheel is moving at a rapid rate. The pole ends of the electro-magnets B, are arranged so that they will move in close proximity to the rail upon which the drive wheel moves, as indicated more clearly in the edge view.

The mechanical devices for fastening the magnets in position upon the wheel may be indefinitely varied without departing from my invention.

In connection with the series of electro-magnets shown, I employ some suitable commutating device whereby the magnets will be energized in succession as each comes into position with its pole opposite the rail. Such a device is indicated at C, and may be of the mechanical construction employed for commutators of dynamo electric machines, being fastened upon the locomotive drive wheel by any proper device. One end of the coil for each electro-magnet B, is connected to one of the commutator segments D. The remaining ends of the coils connect to a ring or disk of conducting material insulated from such segments and shown at E, Fig. 2. Upon such ring bears a brush or conductor connected with one pole of the source of electric energy which may be a dynamo machine borne upon the locomotive and driven from a small engine thereon, while upon the series of commutator segments bears another contact brush connected to the other pole with which brush said segments make connection successively at proper time for closing the circuit of the magnets in succession as before explained. The brushes may be mounted on any desired support in the position indicated.

It will be seen that as the wheel revolves the magnets will in succession be energized as they come into position to do effective work but that at other portions of their revolution they will be thrown out of the circuit. As the cores of the magnets are separate from the rim of the wheel there is no dissipation of the magnetism through such rim and body or into the drive wheel axle.

Instead of supporting such electro magnets upon the inner face of the drive wheel they might be constructed by the use of separate spokes in the drive wheel the ends of which would project through the rim of the wheel but would be magnetically insulated therefrom. These spokes might be auxiliary spokes or might be the ordinary spokes with the suitable modification to provide for magnetic insulation. The poles of the magnets when thus constituted may either revolve or move so as to make contact successively with the rails or may move so as to come into close proximity with the rail.

It will be obvious to electricians that the connections of the magnets and commutator and the construction of the latter suitable for throwing the magnets into and out of circuit in the manner described might be varied without departing from the invention.

I have shown in the drawings a wheel provided with eight magnets, but I do not limit myself to any particular number of the same which may be greater or less than that shown.

What I claim as my invention is—

1. The combination with a locomotive drive wheel having an iron rim, of a series of electro-magnets having separate poles magnetically separated or insulated from one another and from said rim and arranged in the circumference of a circle and moving in succession into contact or immediate proximity with the rail, as and for the purpose described.

2. The combination with a locomotive drive wheel, of a series of independent electro-magnets having their cores disposed on radial lines and their pole ends arranged to be presented in succession to the rail upon which the wheel moves but magnetically separated from one another at such pole ends.

3. The combination with a locomotive drive wheel, of a series of independent electro-magnets magnetically insulated from said wheel and having their poles arranged to come successively into contact or immediate proximity with the rail, and commutating or circuit changing devices for closing the circuit of said magnets in succession while each is in position with its pole opposite the rail so as to prevent slip of said wheel under the action of the propelling power.

4. The combination with a locomotive drive wheel, of a series of electro-magnets fastened to the inner side of the wheel but magnetically insulated therefrom and having their cores arranged on radial lines as described, in combination with commutating or circuit changing appliances for throwing the coils of said magnets into circuit in succession when they are in vertical position with their poles presented to the rail.

5. The combination with a locomotive drive wheel, of separate electro-magnets B, fastened to the inner side of the spokes of said wheel.

6. The combination, substantially as described, with a locomotive drive wheel, of a series of electro-magnets B, fastened to the inner side of the spokes of said drive wheel, and a commutator upon the drive wheel or axles thereof, as and for the purpose described.

Signed at Baltimore city, in the State of Maryland, this 3d day of October, A. D. 1890.

CHARLES SELDEN.

Witnesses:
MURRAY HANSON,
WILLIAM H. BERRY.